United States Patent
Vangala et al.

(10) Patent No.: US 11,874,939 B2
(45) Date of Patent: Jan. 16, 2024

(54) GENERATING USER-SPECIFIC ENTITY INTERLINKAGES OF EXTRACTED ENTERPRISE TOPIC DESCRIPTIONS

(71) Applicant: MICROSOFT TECHNOLOGY LICENSING, LLC, Redmond, WA (US)

(72) Inventors: Vipindeep Vangala, Hyderabad (IN); Ranganath Kondapally, Hyderabad (IN); Pankaj Vasant Khanzode, Hyderabad (IN); Beethika Tripathi, Hyderabad (IN); Daraksha Parveen, Hyderabad (IN); Madan Gopal Jhanwar, Hyderabad (IN); Jimish Bhayani, Hyderabad (IN); Priyam Bakliwal, Hyderabad (IN); Jatin Kakkar, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 420 days.

(21) Appl. No.: 17/163,420

(22) Filed: Jan. 30, 2021

(65) Prior Publication Data

US 2022/0245267 A1    Aug. 4, 2022

(51) Int. Cl.
*G06F 21/62*  (2013.01)
*G06N 20/00*  (2019.01)
(Continued)

(52) U.S. Cl.
CPC ......... *G06F 21/6218* (2013.01); *G06N 20/00* (2019.01); *G06Q 10/101* (2013.01); *G06Q 10/105* (2013.01)

(58) Field of Classification Search
CPC .............. G06F 16/9035; G06F 16/907; G06F 21/6218; G06F 21/62; G06N 20/00; G06N 5/022
See application file for complete search history.

(56) References Cited

U.S. PATENT DOCUMENTS 7,236,923 B1  6/2007 Gupta
7,536,297 B2  5/2009 Byrd et al.
(Continued)

OTHER PUBLICATIONS

Gonçalves, et al., "Automated Expertise Retrieval: A Taxonomy-Based Survey and Open Issues", In the Journal of ACM Computing Surveys, vol. 52, Issue 5, Sep. 13, 2019, 30 Pages.
(Continued)

*Primary Examiner* — Olugbenga O Idowu
(74) *Attorney, Agent, or Firm* — Newport IP, LLC; Jacob P. Rohwer

(57) ABSTRACT

An entity interlinkage platform may receive a corpus of enterprise documents and user profile data that corresponds to an individual user. The entity interlinkage platform utilizes topic extraction models to extract entities from the corpus and further utilizes the user profile data to generate a knowledge graph that includes interlinkages between the extracted entities. The entity interlinkage platform may identify a multitude of topic descriptions and corresponding topic terms from source documents that an access control list permits an individual user to access. Then, based on the user profile data, the entity interlinkage platform may generate a knowledge graph that is tailored for the individual user's specific purposes within the enterprise. For example, the knowledge graph may be generated based on knowledge graph preferences (which may be defined by the individual user) indicating preferred topic description types and/or levels of detail in association with specific topics and/or categories of topics.

20 Claims, 7 Drawing Sheets

(51) Int. Cl.
   *G06Q 10/101*    (2023.01)
   *G06Q 10/105*    (2023.01)

(56) References Cited

U.S. PATENT DOCUMENTS

| | | | |
|---|---|---|---|
| 8,498,999 | B1 | 7/2013 | Bhalotia |
| 8,589,370 | B2 | 11/2013 | Feng et al. |
| 9,785,631 | B2 | 10/2017 | Vassilieva et al. |
| 10,255,563 | B2 | 4/2019 | Stickler et al. |
| 10,552,522 | B2 | 2/2020 | Caldwell et al. |
| 2012/0102050 | A1* | 4/2012 | Button ............... G06N 5/043 707/E17.014 |
| 2019/0266336 | A1* | 8/2019 | Scheideler ......... G06F 21/6218 |
| 2020/0117758 | A1* | 4/2020 | Lu ..................... G06F 16/9538 |

OTHER PUBLICATIONS

"International Search Report and Written Opinion Issued in PCT Application No. PCT/US22/012395", dated Mar. 29, 2022, 14 Pages.

Li, et al., "The Author-Topic-Community Model for Author Interest Profiling and Community Discovery", In the Journal of Knowledge and Information Systems, vol. 44, Issue 2, Jul. 20, 2014, pp. 359-383. (see abstract.).

Vizcarra, et al., "Violence Identification in Social Media", In Proceedings of Joint International Semantic Technology Conference, Feb. 14, 2020, pp. 35-49. (see abstract).

Devlin, et al., "BERT: Pre-training of Deep Bidirectional Transformers for Language Understanding", In Repository of arXiv:1810.04805v1, Oct. 11, 2018, 14 Pages.

Hu, et al., "Mining and Summarizing Customer Reviews", In Proceedings of the Tenth ACM SIGKDD International Conference on Knowledge Discovery and Data Mining, Aug. 22, 2004, pp. 168-177.

Lan, et al., "Albert: A Lite Bert for Self-Supervised Learning of Language Representations", In Repository of arXiv:1909.11942v1, Sep. 26, 2019, 16 Pages.

Sanh, et al., "DistilBERT, a Distilled Version of BERT: smaller, faster, cheaper and lighter", In Repository of arXiv:1910.01108v1, Oct. 2, 2019, 5 Pages.

Spala, et al., "DEFT: A Corpus for Definition Extraction in Free-and Semi-Structured Text", In Proceedings of the 13th Linguistic Annotation Workshop, Aug. 1, 2019, pp. 124-131.

Tang, et al., "Distilling Task-Specific Knowledge from BERT into Simple Neural Networks", In Repository of arXiv:1903.12136v1, Mar. 28, 2019, 8 Pages.

* cited by examiner

GENERATING USER-SPECIFIC ENTITY INTERLINKAGES OF EXTRACTED ENTERPRISE TOPIC DESCRIPTIONS

BACKGROUND

Advances in knowledge extraction techniques facilitate mining through vast amounts of documentation to identify topics of interest. For example, a modern knowledge extraction algorithm may be utilized to identify topics and corresponding topic descriptions from an enormous corpus of public and/or private data. A typical process for identifying such information from a corpus includes mining the corpus and generating discrete topic documentation in association with individually identified topics. In some cases, the generated discrete topic documentation may be further compiled into a vast knowledge graph that represents a collection of interlinkages between individual discretely documented entities (e.g., topics descriptions such as topic definitions, events, concepts, etc.). In this way, modern knowledge extraction techniques are useful tools for preserving public and/or private knowledge on a large and indiscriminate scale.

One major drawback of modern knowledge extraction techniques is that documenting and then indiscriminately providing user-access to extracted information often leads to individual user's being presented with pieces of information that fail to serve their specific needs. This is in part because a particular topic may have different meanings to different users depending on the users' specific contexts. Thus, presenting individual users with information that does not match their specific context can lead to significant distractions and other inefficiencies. For example, presenting a marketing specialist with a highly detailed topic description that is suitable for engineering personnel can lead to distraction and confusion (e.g., via information overload). On the other hand, failing to present individual users with information that is appropriately detailed can leave users wanting and searching for desired information from alternative sources. For example, presenting marketing information to an engineer searching to understand or even utilize implementation details for a software product will be useless for the engineer's specific context.

It is with respect to these and other considerations that the disclosure made herein is presented.

SUMMARY

Technologies described herein facilitate generation of user-specific entity interlinkages of extracted enterprise topic descriptions. Generally described, embodiments described herein generate knowledge graphs defining entity interlinkages between various entities that have been extracted from a corpus by machine learning (ML) models. The knowledge graphs may be uniquely generated based on user profile data associated with an individual user account. Exemplary user profile data may define directory attributes associated with the individual user account, user knowledge graph preferences associated with the individual user account, and/or access permissions associated with the individual user account. In this way, knowledge graphs may be generated and maintained that uniquely correspond to individual users and, therefore, contain information that matches the users' preferences and/or specific job responsibilities within the enterprise. For example, suppose that the user profile data indicates that an individual user has a job title of "Software Engineer" and has set knowledge graph preferences indicating a desire for highly detailed descriptions of software related topics and high level (e.g., low detail) descriptions of all other topics. Under these circumstances, a knowledge graph may be uniquely generated for this user that includes the most highly detailed descriptions that are available for software topics but merely high level (e.g., cursory or low detail) descriptions of marketing topics. In some cases, the user-specific knowledge graph may be specifically generated to omit information that is extracted from sources the user is not permitted to access. Once the knowledge graph is generated, various trigger events may cause information from the knowledge graph to be provided or exposed to a corresponding user. In this way, knowledge graphs may be generated that include pieces of information that are specifically suited to serve individual users' specific purposes within an enterprise. Thus, the drawbacks of modern knowledge extraction techniques described above are mitigated by the presently disclosed techniques.

In an exemplary embodiment, an entity interlinkage platform receives a corpus of documents that are stored in an enterprise data store and further receives user profile data associated with an individual user. The corpus and user profile data may be utilized as described below to generate a knowledge graph that is user-specific in the sense that it is tailored to suit an individual user's specific purpose within an enterprise. Information may be selectively exposed from the knowledge graph based on various triggering events such as viewing a document which references a topic for which one or more topic descriptions are included within the knowledge graph.

The corpus may be extracted from enterprise computing resources that store documents in association with multiple different user accounts. Enterprise computing resources may include data sources that uniquely correspond to individual user accounts such as, for example, email data or personal cloud storage data. Additionally, or alternatively, the enterprise computing resources may include data sources that are accessible by way of two or more different user accounts such as, for example, web-based collaboration platforms (e.g., Microsoft® SharePoint®) that are accessible and/or editable by multiple users. In some embodiments, the corpus is generated in a manner that specifically omits documents that satisfy corpus exclusion criteria. For example, the corpus may omit individual documents having corresponding metadata indicating that the individual documents are confidential and/or proprietary notwithstanding such documents being stored in data sources designated for description mining.

The user profile data may define various criteria based upon which the user-specific knowledge graph may be generated. In some implementations, the user profile data may define directory attributes associated with the user. For example, the user profile data may define a value for a "department" attribute indicating an enterprise department to which the user belongs, a "title" attribute indicating a job title of the user within the enterprise, and/or a "manager" attribute indicating a manager to which the user reports. Additionally, or alternatively, the user profile data may define knowledge graph preferences associated with the user. For example, a user may explicitly define via some form of user interface that she prefers to have highly detailed topic descriptions for topics of a certain category (e.g., software related topics) and relatively less detailed topic descriptions (e.g., high level or cursory topic descriptions) for topics of some other category (e.g., marketing related topics). Additionally, or alternatively, the user profile data may include an access control list that defines permissions and/or restrictions for the user in association with various enterprise documents.

The entity interlinkage platform may input the corpus into one or more topic extraction models that extract topic descriptions for topics that are relevant within the corpus. The topic extraction models may include various machine learning (ML) models such as, for example, a natural language processing (NLP) model that is configured to identify a category of individual sentences and/or groups of sentences within the set of documents that make up the corpus. Exemplary categories include, but are not limited to, authoritative definitions for identified topics, information associated with identified topics, and opinions regarding identified topics. In some implementations, multiple different types of topic extraction models may be deployed to extract different types of topic descriptions from the corpus. For example, a first topic extraction model may be deployed to extract single line definitions from the corpus, a second topic extraction model may be deployed to extract multiple line definitions from the corpus, and a third topic extraction model may be deployed to generate summarizations corresponding to identified topics. In some implementations, multiple topic descriptions for any particular topic may be extracted and compiled into a ranked listing based on the user profile data. In such implementations, the ranked listing may be utilized to generate a user-specific knowledge graph. The topic extraction models may generate an output that identifies topics and corresponding topic descriptions and/or the ranked listing.

The output from the topic extraction model(s) may then be provided to an entity linkage model that determines entity linkages between various entities (defined in the output) based on the user profile data. These entity linkages may form a knowledge graph that corresponds to the user profile data. Exemplary such entities which may be linked within the knowledge graph include topics, topic descriptions (including topic definitions, summarizations, and/or opinions), events, concepts, and any other entity suitable for ML based extraction techniques—whether currently known or subsequently developed. An exemplary knowledge graph may include multiple linkages that define a hierarchy of topic descriptions for various topics that are ordered or prioritized based on the user profile data. For example, user profile data may include an indication that a particular user has a title of "software engineer" and reports to a manager that leads a "Research and Development" arm of a ML department. Based on such user profile data, a user-specific knowledge graph may be generated that includes direct or first order linkages between software topics associated with ML and highly detailed topic descriptions corresponding to these software topics. For example, topics that are categorized as being related to ML software technologies may be directly linked to topic descriptions that include sophisticated implementation details that are suited for experts in such technologies. In some implementations, topic descriptions that are related to ML software technologies but designed for persons who are not ML experts (e.g., marketing materials, accounting materials, etc.) may have second or higher order linkages to the ML software technologies. In this way, the user-specific knowledge graph may be designed to inherently prioritize topic descriptions (and other entity forms) that are most likely to suit the individual user's specific purpose within an enterprise while affording lesser priority to other topic descriptions which, although relevant or related to the topics, are not designed for the specific purposes indicated within the user profile data.

In some embodiments, the knowledge graph may include entity linkages only to entities that are extracted from source documents which an access control list permits the individual user to access. For example, if the output from the topic extraction model includes a first topic description that has been extracted from a source document that a user is permitted to access (e.g., a SharePoint document that is published to members the user's department) and a second topic description that has been extracted from a different source document that the user is restricted from accessing, then the entity linkage model may generate a knowledge graph that includes an entity linkage to the first topic description but omits entity linkages to the second topic description. In this way, customized knowledge graphs may be generated for an enterprise on a per-user and/or per-user-group basis. In some embodiments, as described in detail below, a master or entity-wide knowledge graph may be generated to encompass a vast amount of extracted enterprise knowledge which is suitable for different purposes. In such embodiments, aspects of the knowledge graph may be selectively presented in accordance with user profile data for individual recipients of the knowledge graph information.

The knowledge graph may be provided to a description serving module which is configured to surface aspects of the knowledge graph to recipients based on various trigger events. For example, a trigger event may correspond to a recipient opening an email or other document including a reference to a particular topic for which the knowledge graph includes entity linkages to one or more topic descriptions. Here, the description serving module may select a topic description from the knowledge graph and surface the same by linking the reference to the topic in the document to a topic card that includes the selected topic description.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
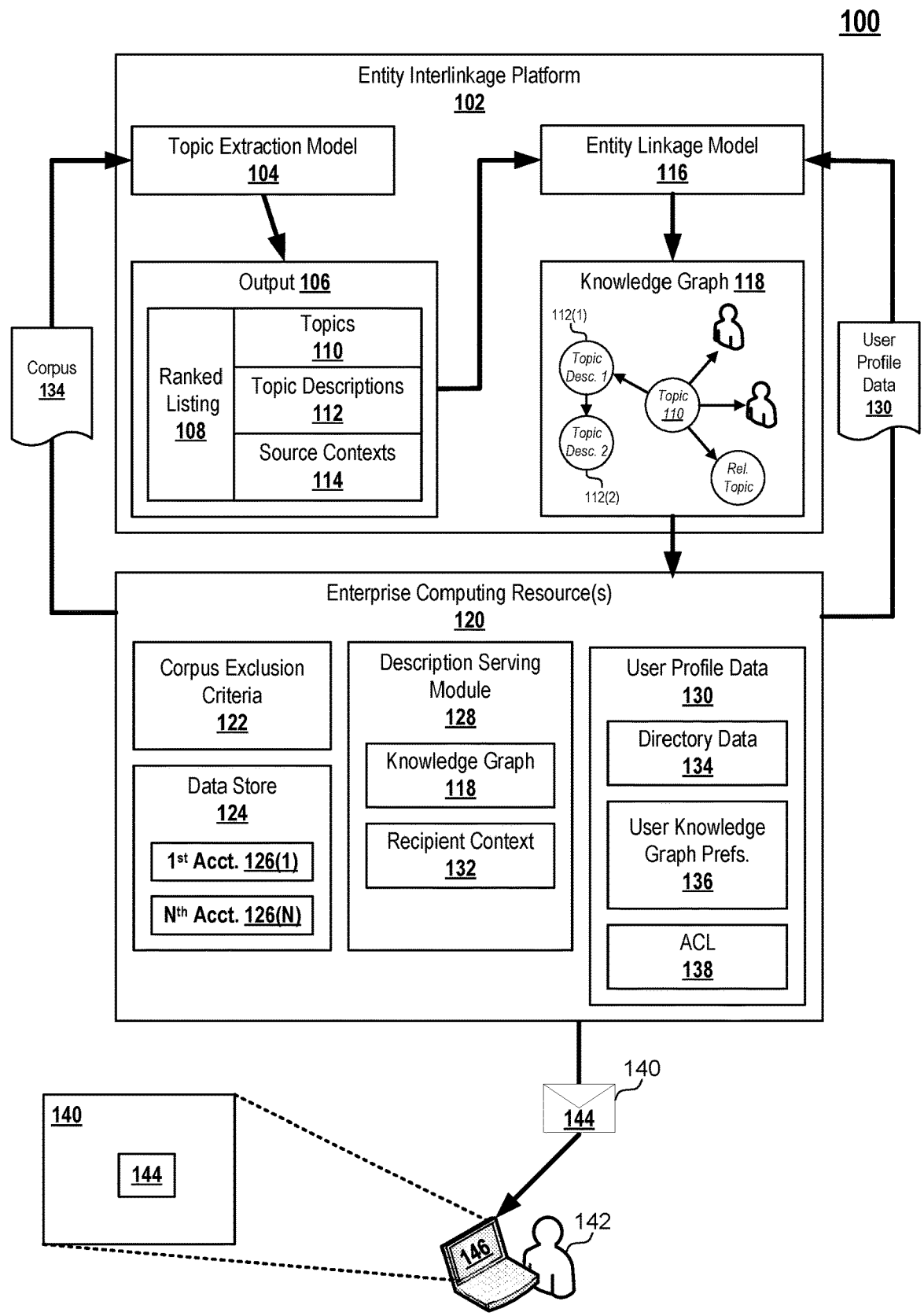
FIG. 1 illustrates an exemplary computing environment in which multiple topic descriptions are extracted from a corpus and then compiled into a knowledge graph in accordance with user profile data.

The following Detailed Description describes techniques for generating user-specific entity interlinkages of extracted enterprise topic descriptions. Generally described, an entity interlinkage platform may receive both of a corpus of enterprise documents and user profile data that corresponds to one or more individual users. The entity interlinkage platform may utilize topic extraction models to extract multiple entities from the corpus and further utilize the user profile data to generate a knowledge graph that includes interlinkages between the extracted entities. For example, the entity interlinkage platform may identify a multitude of topic descriptions and corresponding topic terms from source documents (within the corpus) that an access control list permits an individual user to access. Then, based on the user profile data, the entity interlinkage platform may generate a knowledge graph that is tailored for the individual user's specific purposes within the enterprise. For example, the knowledge graph may be generated based on knowledge graph preferences (which may be defined by the individual user) indicating preferred topic description types and/or levels of detail in association with specific topics and/or categories of topics.

In this way, the knowledge graphs generated by the entity interlinkage platform may include pieces of information that are uniquely suited to facilitate the individual user's specific job responsibilities within the enterprise. For example, an exemplary knowledge graph that is generated for a user having the title of "Software Engineer" may interlink software related topics to highly detailed topic descriptions while interlinking relatively less detailed topic descriptions to other topic categories related to subject matter which the user has less expertise in. Subsequently, when this user accesses enterprise documents including term-usage instances of topics which have been interlinked to one or more topic descriptions in accordance with the user's uniquely defined user profile data, a description serving module may select from the knowledge graph one or more appropriately linked topic descriptions for exposure to the user in association with the enterprise documents.

In contrast to modern knowledge extraction techniques, implementations of the techniques described herein generate user-specific knowledge graphs containing enterprise knowledge that is extracted from various enterprise computing resources and determined to be contextually relevant to a specific user based on corresponding user profile data. Thus, rather than indiscriminately presenting enterprise knowledge from knowledge graphs in which various types of information are interlinked without respect to individual users' specific roles, interests, or context within an enterprise, the techniques described herein generate entity interlinkages that are specifically tailored to users' directory attributes (e.g., a department which they work in, a manager that they report to, a specific job that are responsible for performing, etc.), knowledge graph preferences (e.g., implicit preferences that are determined based on user activity corresponding to users having similar directory attributes to the user, explicit preferences manually defined by the user, etc.) and/or access control list permission identifying permissions and/or restrictions to access source documents.

Turning now to FIG. 1, illustrated is an exemplary computing environment 100 in which multiple topic descriptions 112 are extracted from a corpus 134 and then compiled into a knowledge graph 118 in accordance with user profile data 130. Then, aspects of the knowledge graph 118 may be surfaced to a recipient 142 based on a corresponding recipient context 132 in which topics 110 associated with the knowledge graph 118 are referenced in documentation 140 that is being accessed by the recipient 142. For example, the recipient 142 may open an email or other document type that references a particular topic 110 that is included within the knowledge graph 118 and linked to one or more other entities such as topic descriptions 112. Based on this trigger event, a topic description 112 may be selected from the knowledge graph 118 and presented to the recipient 142 as a topic card that is superimposed over the document being viewed.

As illustrated, the computing environment 100 includes an entity interlinkage platform 102 that is in communication with one or more enterprise computing resources 120. The enterprise computing resources 120 may include various enterprise data sources which may be publicly available to non-enterprise persons (e.g., public websites generated and/or hosted by an enterprise), selectively available to groups of predefined users within an enterprise (e.g., web-based collaboration platforms shared by groups of users within a specific department), and/or user-specific documentation that is accessible to specific users only by way of user-specific credentials (e.g., an email and/or online data storage that uniquely corresponds to an individual user account). Accordingly, the enterprise computing resources 120 may include email account data that includes individual electronic messages that are stored in association with individual users' email accounts (e.g., Microsoft® Outlook® accounts), business communication platform data that includes messages and/or documents that are accessible via multiple user accounts (e.g., Microsoft® Teams® accounts, Microsoft® Yammer® accounts), public facing internet data that includes webpages or downloadable resources that are accessible to non-enterprise persons, as well as external data such as media Wikis and ServiceNow. The various enterprise data sources may be collectively stored in a data store 124 which may be hosted by an enterprise (e.g., in physical servers owned, operated, and maintained by the enterprise) and/or by a third-party providing computing services to the enterprise as a tenant (e.g., Microsoft® Office365® tenant services).

As illustrated, the entity interlinkage platform 102 receives a corpus 134 that is extracted from the enterprise computing resources 120. Generally described, the corpus 134 is comprised of various digital documents or other electronic data that is stored in association with one or more user accounts 126. In some embodiments, the corpus 134 may be a tenant-specific corpus in the sense that it is at least partially comprised of enterprise data sources that are accessible by way of enterprise issued credentials such as username-password combinations that uniquely correspond to individual user accounts 126. For example, the corpus 134 may include email messages that uniquely correspond to various individual enterprise user accounts and/or web-based collaboration platform data that is accessible and/or editable by multiple user accounts. Thus, the corpus 134 may include pieces of information that are gathered from a multitude of varying data sources that are typically maintained or otherwise provided to employees by a modern enterprise. For example, the corpus 134 may include enterprise data that is specific to an individual enterprise tenant that is facilitated by a third-party productivity platform vendor (Microsoft® Office 365®) and/or enterprise data that is hosted by enterprise owned and operated computing resources.

In some embodiments, the corpus 134 is generated based on corpus exclusion criteria 122 that defines attributes for selectively excluding a subset of enterprise data from the corpus 134. For example, within a modern enterprise's vast data store(s) 124 may be various documents or data files that include sensitive information which the enterprise may deem unsuited for mining. To illustrate this point, suppose that an enterprise has documents related to currently pending or previously pursued mergers and/or acquisitions with other enterprises. As such documents have a high probability of including sensitive data related to proprietary subject matter such as trade secrets which are unsuitable for data extraction, the enterprise may maintain metadata that designates these documents as confidential. The corpus exclusion criteria 122 may inform the entity interlinkage platform 102 and/or enterprise computing resources 120 of certain attributes or characteristics of data which warrant exclusion from the corpus 134 (e.g., to prevent the mining of and subsequent unauthorized disclosure of sensitive information). In an exemplary embodiment, the corpus exclusion criteria 122 may define one or more metadata attributes that prevent individual documents from being compiled into the corpus 134. Additionally, or alternatively, the corpus exclusion criteria 122 may define document characteristics that prevent individual documents from being compiled into the corpus 134. Exemplary document characteristics may include, for example, an inclusion of sensitive personal information such as medical and/or financial data.

Upon receiving the corpus 134, the entity interlinkage platform 102 deploys one or more topic extraction models 104 that are configured to identify entities from within the corpus 134. The topic extraction models 104 may include, for example, Natural Language Processing models that are configured to identify acronyms that are referenced within individual documents of the corpus 134, project names that are referenced and described in enterprise documentation, and various other notable topics that are relevant to the enterprise from which the corpus 134 is obtained. Additionally, or alternatively, the topic extraction models 104 may extract topic descriptions 112 corresponding to identified topics. An exemplary such topic extraction model 104 may be a machine learning model that is configured to identify a category of individual sentences and/or groups of sentences within the set of documents that make up the corpus 134. Exemplary categories include, but are not limited to, authoritative definitions for identified topics, information associated with identified topics, and opinions regarding identified topics.

In some embodiments, the topic extraction models 104 may include a Bidirectional Encoder Representations from Transformers (BERT) model that is configured to perform transformer-based ML techniques to extract different types of topics descriptions including, but not limited to, single line definitions, multiline definitions, and topic summarizations compiled from single or multiple discrete data sources. For example, a BERT model may be deployed to identify candidate topic descriptions from the corpus 134. In some instances, the topic extraction models 104 may further rank the candidate topic descriptions based on enterprise specific signals indicating a level of importance of individual candidate topic descriptions with respect to a particular enterprise. Exemplary such enterprise signals include, but are not limited to, a seniority level of one or more authors of individual topic descriptions, indications of whether author (s) of individual topic descriptions have assigned workloads that correspond or relate to the corresponding topics, and levels of dissemination of individual topic descriptions across an enterprise. In some implementations, these enterprise specific signals are generated by way of supervised learning techniques. By utilizing the enterprise specific signals, the topic extraction models 104 are enabled to identify topic descriptions that are uniquely relevant to a specific enterprise and to further rank these identified topic descriptions at an organizational level (i.e., in a manner that is uniquely appropriate to an individual enterprise).

As illustrated, the topic extraction models 104 generate an output 106 that includes various extracted entities. For example, the output 106 may include multiple different topic descriptions 112 corresponding to various topics 110 that are identifiable within the corpus 134. As further illustrated, the output 106 may be provided to an entity linkage model 116 that determines entity linkages between the various entities identified within the output 106.

In contrast to modern techniques, the operation(s) of determining the entity linkages may be based, at least in part, on the user profile data 130 that is provided to the entity linkage platform 102. Ultimately, the entity linkages that are determined based on the user profile data 130 may be used to compile a knowledge graph 118 that includes or prioritizes interlinkages between entities which align with the user profile data 130. For example, under circumstances in which the user profile data 130 includes user attributes indicative of an expertise level of an individual user with respect to a particular topic, then the knowledge graph 118 may include entity linkages that link the particular topic to corresponding topic descriptions 112 which are suitable for an audience of persons with that expertise level. To further illustrate this example, suppose that user attributes for a specific user indicate that she has a title of "Sr. Software Engineer" and works in a department entitled "Machine Learning R&D." Here, the directory attributes for the specific user indicate that she is likely to have a high level of expertise regarding the topics related to machine learning. Accordingly, in generating a user-specific knowledge graph for this specific user, the entity linkage model 116 may design entity interlinkages that interconnect topics 110 that relate to the subject of machine learning to highly detailed topic descriptions 112 that are authored by persons with a similar expertise level in this subject. In this way, the knowledge graph 118 may be generated in a user-specific manner such that various topic descriptions (or other entities) that are authored by and/or relate to the specific user's peers within the enterprise will be prioritized for inclusion within her knowledge graph 118 over other entities that are more loosely related to the user's specific purpose (e.g., assigned job responsibilities) within the enterprise.

As graphically illustrated in FIG. 1, the knowledge graph 118 may define interlinkages or relationships between a topic 110 and various other entities that are determined to be relevant to the recipient 142 based on the user profile data 130. Here, a topic is shown in the center of the knowledge graph 118 and is interconnected to each of a first topic description, a second topic description, a related topic, and two different persons who are related to the topic. Furthermore, the first topic description is related to the topic with a first order linkage whereas the second topic description is related to the topic via a second order linkage that passes through the first topic description. In some cases, the first order and second order nature of the topic descriptions may be determined based on the user profile data 130. For example, the user profile data 130 may indicate that the recipient 142 has defined a knowledge graph preference 136 indicating that she prefers highly detailed topic descriptions 112 written by engineers with the intended audience of other engineers over more high-level topic descriptions 112 that are written by marketing or business executives for a non-engineer audience. Under these circumstances, the user knowledge graph preferences 136 may determine that the first topic description 112(1) shown in the knowledge graph 118 is written by an engineer and includes a high-level of implementation-type detail whereas the second topic description 112(2) shown in the knowledge graph 118 is a marketing pamphlet written by a marketing specialist. Accordingly, the entity interlinkage platform 102 may define entity interlinkages such that within the knowledge graph 118 the first topic description 112(1) is directly linked to the topic 110 (i.e., a first order link), whereas the second topic description 112(2) is indirectly linked to the topic description 110 via a second order entity interlinkage that passes through the first topic description 112(1). In this way, the recipient 142 may still access the second topic description 112(2) but will be initially driven to the first topic description 112(1) as this has a stronger correlation to the user profile data 130.

In some implementations, the entity interlinkage platform 102 may generate the knowledge graph 118 based on directory data 134 associated with the recipient 142 (or group of recipients) for which a knowledge graph 118 is being generated and/or directory data 134 associated with an author of an entity being interlinked within the knowledge graph 118. For example, when generating a knowledge graph 118 for a recipient or recipient group having certain directory attributes (e.g., having a certain job description and/or working in a certain department type), the entity interlinkage platform 102 may afford greater weight or priority to topic descriptions 112 that are authored by or tend to be accessed by other users having similar directory attributes. In some embodiments, the user knowledge graph preferences 136 for a particular user account or subset of user accounts may be generated based on user activity from an account subset (i.e., a subset of user accounts) that have directory attributes in common with the particular user account or subset of user accounts. For example, if the user activity of the account subsets reveals a preference towards consuming information having certain characteristics, then these implicit signals may be user to generate the user knowledge graph preferences 136. Exemplary such directory attributes that the account subset may have in common with the particular user account may include a department attribute, a title attribute, or a manager attribute.

In some implementations, the knowledge graph 118 may be generated in accordance with a ranked listing 108 defines topics 110 and a prioritized order of one or more topic descriptions 112 corresponding to individual ones of the topics 110. The ranked listing 108 may be generate as a component of the output 106 from the topic extraction model 104. For example, the ranked listing 108 may include two discrete (but potentially overlapping) topic descriptions 112 corresponding to a single identified topic 110. Here, the ranked listing 108 may indicate a priority of these two discrete topic descriptions 112 that may be later utilized by the entity interlinkage model 116 to determine interlinkages for the generation of the knowledge graph 118. For example, in some implementations, the knowledge graph 118 may interlink a first topic description 112 in the ranked listing 108 directly to a corresponding topic 110, a second topic description 112 in the ranked listing 108 indirectly to the corresponding topic 110 via a second order interlinkage, and so on.

In some implementations, the topic descriptions 112 may be ranked in accordance with one or more source contexts 114. Generally described, a source context 114 refers to contextual signals of one or more source documents from which a particular topic description 112 is extracted. For example, a source context 114 may be an indication that a specific document from which a topic description 112 has been extracted was authored by person within an organizational hierarchy of the enterprise that has similar directory attributes to a recipient for which the output 106 and knowledge graph 118 are being generated. Under these circumstances, this particular source context 114 may result in the topic description 112 being ranked higher (e.g., prioritized for exposure) over one or more other topic descriptions that correspond to the same identified topic but are authored by personnel having significantly different job responsibilities within the enterprise as compared to the recipient 142. As a specific but nonlimiting example, a source context 114 may be an indication that a specific document from which a topic description 112 has been extracted was authored by a member of an accounting department. Under these circumstances, this particular source context 114 may result in the topic description 112 being prioritized for exposure when a recipient context 132 indicates that a recipient is also a member of the accounting department. In this way, topic descriptions 112 may be selected for exposure based on a correspondence between source context 114 and recipient context 132. For example, an indication that an author of a particular topic description 112 has a similar relationship with respect to a topic as a recipient may weigh in favor of prioritizing the particular topic description within the knowledge graph 118.

In some embodiments, the knowledge graph 118 may further be generated based on an access control list 138 associated with the user profile data 130. For example, the entity interlinkage platform 102 may identify a multitude of topic descriptions and corresponding topic terms from source documents (within the corpus) that an access control list 138 permits the recipient 142 to access. Then, based on the access control list 138, the entity interlinkage platform 102 may generate a knowledge graph that is tailored for the individual user's specific access permissions within the enterprise. For example, the knowledge graph may be generated based on the access control list 138 and the knowledge graph preferences 136 (which may be defined by the individual user) indicating preferred topic description types and/or levels of detail in association with specific topics and/or categories of topics.

As further illustrated, the knowledge graph 118 may be provided to a description serving module 128 that selects entities from the knowledge graph 118 to present to the recipient 142. In some instances, the entities (e.g., topics, topic descriptions, people, etc.) may be selected based on a combination of a source context 114 and a recipient context 132. As a specific example, suppose that the first topic description 112(1) is extracted from first data 126(1) that corresponds to a first document that is published enterprise wide (e.g., all enterprise users are granted access to the document) whereas a second topic description is extracted from Nth data 126(N) that corresponds to an Nth document that is also published enterprise wide. Thus, in this example the recipient 142 does have access to the underlying sources of each of the first topic description and second topic description. Further suppose that the first document is a technical engineering document that is authored by a computer scientist to communicate sophisticated implementation details to other computer scientists whereas the second document is a marketing document that is authored by a marketing specialist to communicate high level information to potential customers. Here, it can be appreciated that the underlying source contexts 114 of the first and second topic descriptions is drastically different. Accordingly, the description serving module 128 may map the underlying source contexts 114 to the recipient context 132 to select between the two topic descriptions within the knowledge graph 118. Ultimately, one or more selected entities 144 may be presented to the recipient 142 in association with a document 140 that is being viewed or otherwise accessed via a computing device 146.

It will be appreciated based on the foregoing that in some implementations the knowledge graphs 118 generated according to the techniques described herein may be highly customized on the basis of individual users or groups of users based on directory attributes, knowledge graph preferences 136, and/or access permissions defined in an access control list 138. Thus, the knowledge graph 118 may specifically include and/or prioritize entities that align with directory data 134 and or user knowledge graph preferences 136. Additionally, or alternatively, the knowledge graph 118 may specifically omit entities that are extracted from source documents which an access control list 138 restricts a corresponding user (for which the knowledge graph 118 is generated) from accessing.

Figure 2:
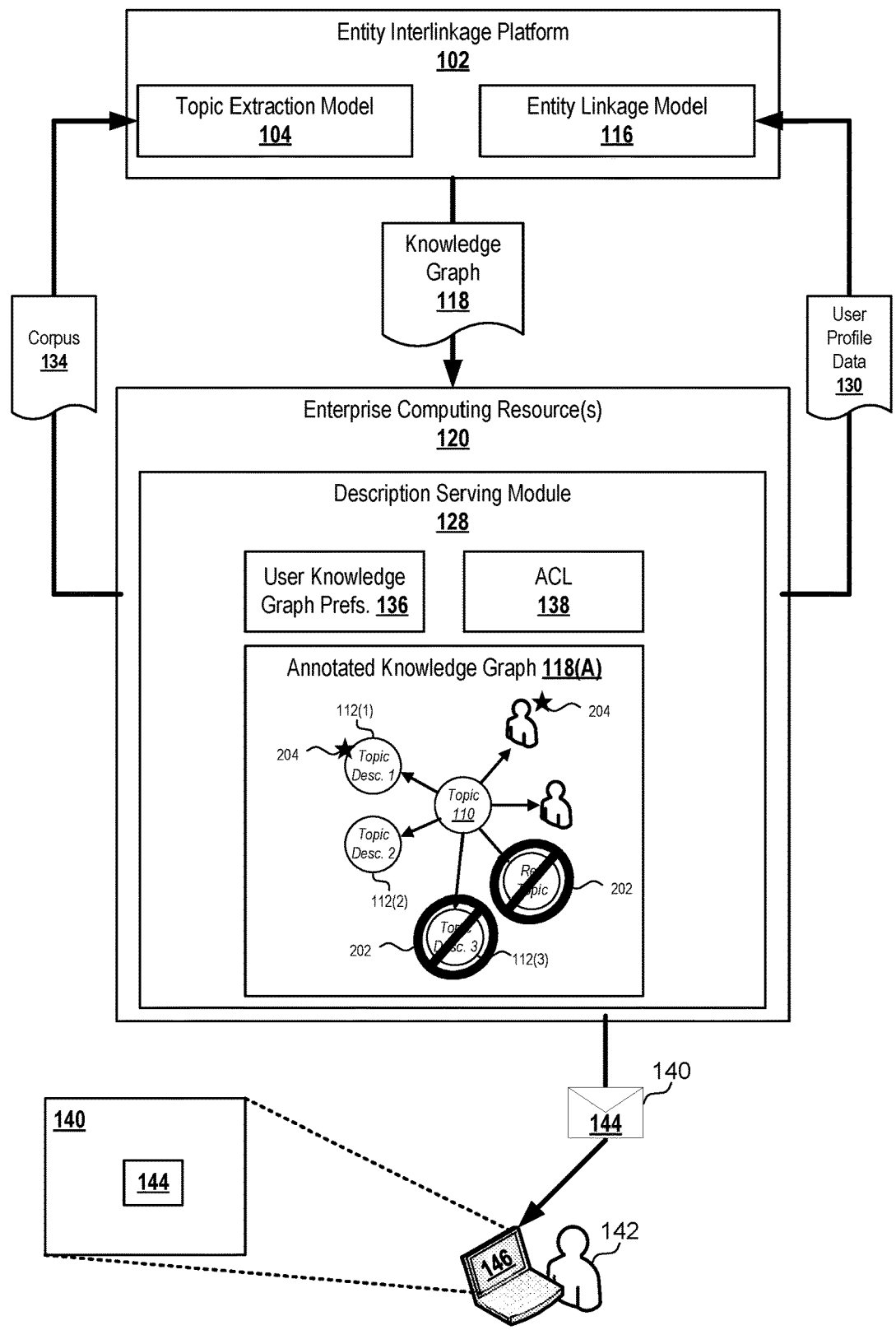
FIG. 2 illustrates an exemplary computing environment in which the description serving module applies annotations to a knowledge graph received from the entity interlinkage platform.

Turning now to FIG. 2, illustrated is an exemplary computing environment 200 in which the description serving module 128 applies annotations to a knowledge graph 118 received from the entity interlinkage platform 102. For example, the entity interlinkage platform 102 may generate a knowledge graph 118 that includes one or more entities which a recipient 142 is restricted from viewing (e.g., due to be restricted from accessing corresponding source documents) and/or various entities which do and do not align with the user knowledge graph preferences 136. Under these circumstances, the description serving module 128 may generate an annotated knowledge graph 118(A) based on the user knowledge graph preferences 136 and/or the access control list 138.

In some embodiments, the annotated knowledge graph 118(A) includes access restriction annotations 202 in association with one or more entities included within the knowledge graph 118 that is generated by the entity linkage model 116. For example, the annotated knowledge graph 118(A) includes an access restriction annotation 202 in association with a third topic description 112(3) that has been extracted from a source document that the ACL 138 restricts the recipient 142 from accessing. Additionally, the annotated knowledge graph 118(A) includes another access restriction annotation 202 in association with a related topic that is interlinked to the topic 110 within the knowledge graph 118. For example, the related topic may be a newly developed technology that is highly proprietary and which only certain personnel which are explicitly named within the ACL 138 are permitted to view information for.

In some embodiments, the annotated knowledge graph 118(A) includes user preference annotations 204 in association with one or more entities included within the knowledge graph 118 that is generated by the entity linkage model 116. For example, the annotated knowledge graph 118(A) includes a user preference annotation 204 in association with a first topic description 112(1), which may be added to the annotated knowledge graph 118(A) based on the recipient 142 manually defining a preference toward topic descriptions having characteristics exhibited by the first topic description 112(1). Additionally, or alternatively, the annotated knowledge graph 118(A) may include a user preference annotation 204 in association with a specific person/user which the recipient has manually elected to follow and/or has directory attribute values that match or align with those of the recipient 142.

The annotated knowledge graph 118(A) may then be utilized to select entities to present to the recipient 142 in response to various trigger events. Here, entities that are associated with access restriction annotations 202 may be restricted/prevented from being exposed to the recipient. Furthermore, entities that are associated with user preference annotations 204 may be prioritized for exposure to the recipient 142 over other entities that are not similarly annotated.

Figure 3:
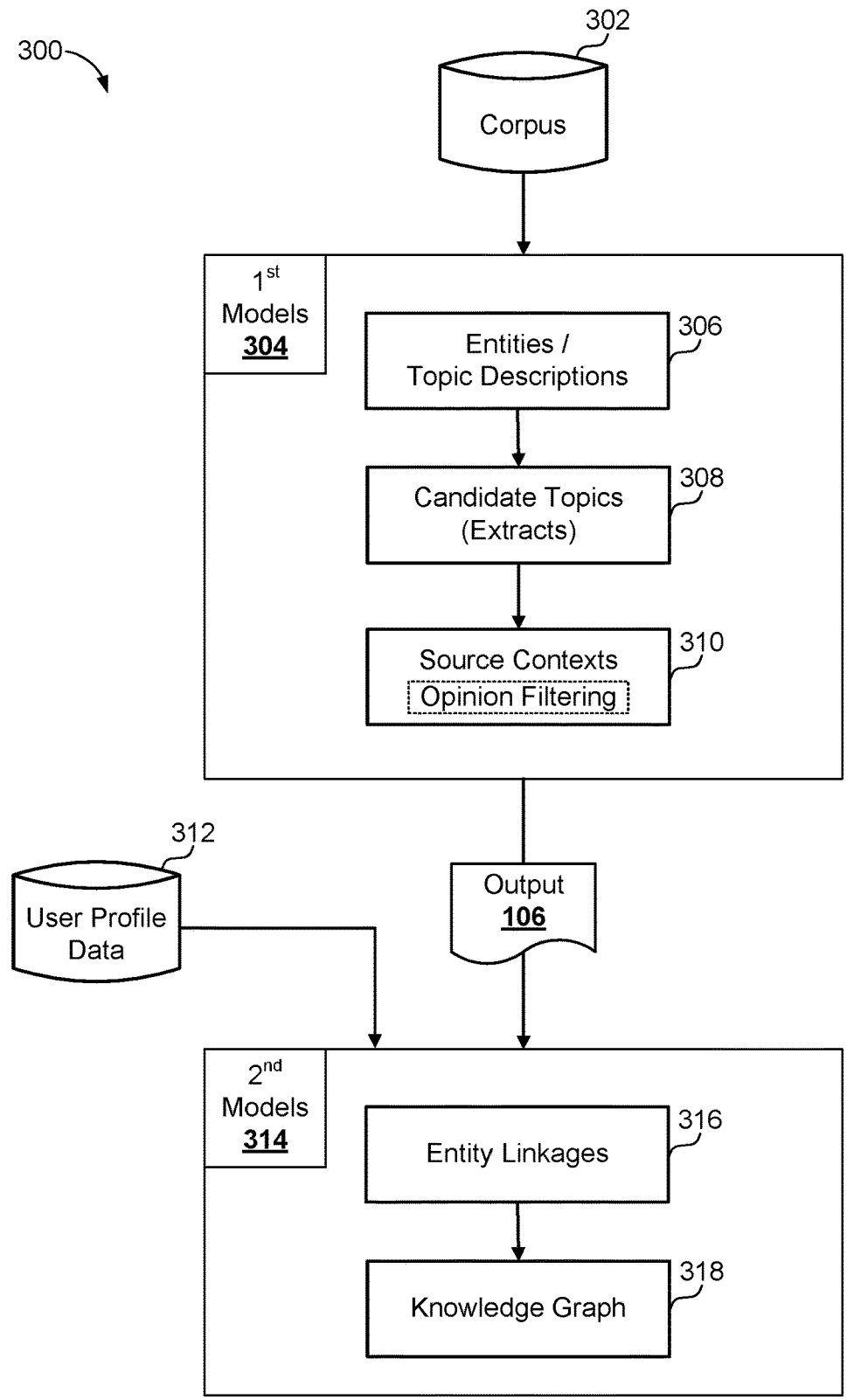
FIG. 3 illustrates an exemplary knowledge graph generation process in which one or more ML models may analyze a corpus to extract entities and to further generate a knowledge graph of the extracted entities based on user profile data.

Turning to FIG. 3, illustrated is an exemplary knowledge graph generation process 300 in which one or more ML models may analyze a corpus 302 to extract entities 306 (which may include topic descriptions 112) and to further generate a knowledge graph 318 of the extracted entities based on user profile data 312. The corpus 302 may include vast amount of enterprise-specific, user-specific, and/or public information in the form of unstructured text. In an exemplary implementation, the corpus 302 may be defined in association with compliance boundary parameters to enable topic and topic description mining from information that is distributed across various systems and/or teams within an organization (e.g., enterprise). As described herein, the topic descriptions 112 that are mined may compiled into a knowledge graph 318 and then seamlessly delivered to recipients via the various systems or computing resources that are commonly utilized within an enterprise ecosystem (e.g., productivity suite applications such as those provided via the Microsoft® Office 365' productivity suite applications).

In various implementations, the mining process 300 may be performed for a particular entity type such as a predetermined topic type (e.g., a name, a project, an event, etc.) and/or a predetermined topic description type (e.g., definitions, opinions, etc.). Individual entity types may be defined by one or more schema. A project is an example of a topic type for which one or more topic descriptions 112 may be extracted via various NLP techniques. Other entity types include, but are not limited to, person names, products, services, or any other entity type suitable for various topic modeling techniques (e.g., cascaded Linear Discriminant Analysis (CLDA) classifier, Nonnegative Matrix Factorization (NMF), and/or transformer-based models such as BERT). In some implementations, the mining process 300 may use topic templates to identify entities such as candidate topic descriptions and/or candidate topic names. In some implementations, the topic templates may include text or other formatted data with placeholders to insert formatted values of properties of the individual candidate topic descriptions. The topic templates may include many templates per topic type. Individual topic templates may be applied to various windows or snippets of text from the corpus 302 that can contain single or multi-word entity type.

The mining process 300 may include operation 306 for extracting topic descriptions from the corpus 302 based on the one or more first ML models 304 as described herein. As described below, candidate topics or "terms" may be identified from within these extracted topic descriptions. In some implementations, the first ML models 304 deployed at operation 306 may include various NLP understanding models that have been specifically developed for definition mining. In one exemplary embodiment, the first ML models 304 include a BERT model that has been specifically configured to perform a definition classification task, and which has been further distilled by training the bidirectional LSTM model using the probability logits obtained from BERT. Exemplary topic descriptions which may be extracted from the corpus 302 based on the first ML models 304 may fall into various categories or labels that include, but are not limited to, definition, non-definition, informational, person-definition, and referential. For purposes of the present disclosure, the categories or labels of topic descriptions may be defined as follows:

An extracted topic description may be labeled as a "definition" if it refers clearly to the term and can uniquely define only that term. If it does not already appear as such, the extracted topic description may be rephrased into the form of "X is a Y and no other term Z could be defined using Y." In this sense, an exemplary definition type topic description of the topic "statistics" may be: statistics is a branch of mathematics dealing with data collection, organization, analysis, interpretation and presentation.

An extracted topic description may be labeled as "information" if it provides information or context related to a topic but yet cannot uniquely define the topic. In this sense, an exemplary information type topic description of the topic "statistics" may be: statistics is a branch of mathematics.

An extracted topic description may be labeled as "person-definition" if it provides information related to the name of a person. In this sense, an exemplary person-definition type topic description of the topic (and in this case name) "Peter Clark" may be: Peter Clark is a Senior Associate at CEA with broad experience in technical, political, and legal analysis on air pollution issues.

An extracted topic description may be labeled as "referential" if it is within a definition but contain an explicit term usage instance of the topic but does contain a reference to the topic. In this sense, an exemplary referential type topic description may be: This method is used to identifying a hyperplane which separates a positive class from the negative class.

An extracted topic description may be labeled as "non-definition" if it provides information or context related to a topic but does not fall into any of the aforementioned labels. In this sense, an exemplary non-definition type topic description may be: The Caterpillar 797B is the biggest car I've ever seen.

The mining process 300 may further include operation 308 for identifying candidate topics (e.g., terms) from within the extracted entities (e.g., topic descriptions). In some implementations, the operation 308 corresponds to the use of rule-based term extractor that is applied to the topic descriptions extracted at operation 306. Generally described, a rule-based term extractor may be configured to identify terms (e.g., topics) from which the extracted entities. In some implementations, the rule-based term extractor may be based on a hypothesis that substantially all definition sentences include a finite and identifiable number and/or type of verb phrases. Exemplary such verb phrases may include, but are not necessarily limited to, "is defined as," "means," and "is a." The rule-based term extractor may be further based on a hypothesis that the subject term or topic of such definition sentences occurs in the left side of these verb phrase patterns. For example, the sentence "statistics is a branch of mathematics dealing with data collection, organization, analysis, interpretation and presentation" includes the topic "statistics" on the left side of the verb phrase pattern "is a" which is then followed by a definition type topic description corresponding to the topic.

The mining process 300 may further include operation 310 for determining source contexts associated with the extracted entities. For example, the operation 310 may include determining an author and/or authors associated with individual topic descriptions. In some implementations, an identified source context may include an authoritative status of a person(s) who authored one or more topic descriptions, dissemination levels of individual topic descriptions across user accounts and/or the enterprise computing resources, attributes of source documents from which the topic descriptions are extracted, and so on.

As illustrated in FIG. 3, in some embodiments the operation 310 may include opinion filtering. It can be appreciated for example that in some cases topic descriptions that are extracted from the corpus 302 may have an element of opinion. As it may be undesirable for opinions contained within individual topic descriptions to impart bias on recipients, in some implementation topic descriptions which are identified as having an element of opinion may be filtered out (e.g., removed/discarded) and/or flagged as being opinion in nature.

Based on operations 306, 308, and/or 310, the first ML models 304 may generate an output 106 that is provided to one or more second ML models 314 in conjunction with user profile data 312. For example, the first ML models 304 may correspond to the topic extraction model 104 whereas the second ML models 314 may correspond to the entity linkage model 116.

The mining process 300 may further include operation 316 at which entity linkages are determined for entities defined in the output 106. The entity linkages may be determined based on the user profile data 312. For example, entity linkages may be determined based on the user knowledge graph preferences 136 that are manually defined by an individual user. In such an example, entity linkages may be included or prioritized over other entity linkages for topic descriptions having characteristics (e.g., source contexts, etc.) that correspond to user preferences. Additionally, or alternatively, entity linkages may be determined based on the access control list 138. For example, the second ML models 314 may determine which entities from the output 106 have been extracted from source documents which an individual user is permitted to access and/or restricted from accessing. Then, the second ML models 314 may limit entity linkages to those entities which have been extracted from source documents the user is permitted to access and/or not restricted from accessing.

The mining process 300 may further include operation 318 at which a knowledge graph is generated based on the entity linkages determined at operation 316. Based on the entity linkages, the knowledge graph 316 may define various interlinking relationships between a topic 110 and one or more other topics such as, example, documents, websites, persons, and other entity types. Exemplary interlinking relationships may include, for example, related experts, frequently used together, similar, disambiguation, and so on. By generating the knowledge graph based on the user profile data 312, the process 300 is suitable for generating highly customized knowledge graphs on a per-user and/or per-user-group basis. In this way, knowledge graphs may be generated that include pieces of information that are specifically suited to serve individual users' specific purposes within an enterprise. Thus, the drawbacks of modern knowledge extraction techniques described above are mitigated by the presently disclosed techniques.

Figure 4:
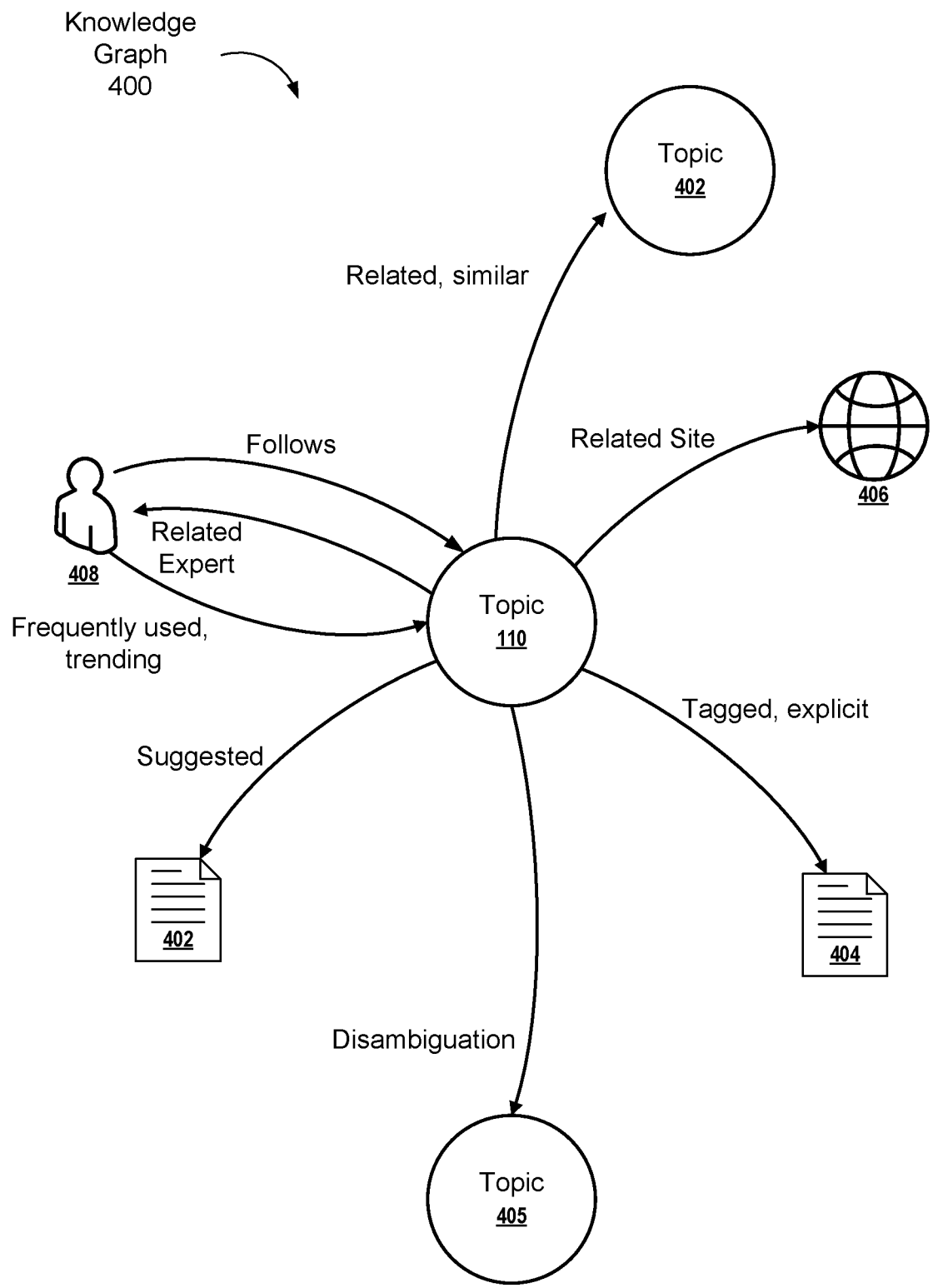
FIG. 4 illustrates an example knowledge graph that can be generated based on user profile data as described herein.

Referring now to FIG. 4, illustrated is an example knowledge graph 400 that can be generated based on user profile data as described herein. The example knowledge graph 400 includes entities 402, 404, 406, 408, 402, 405 and relationships between the entities. In an implementation, each entity is represented by an entity record that includes attributes that describe the entity. For example, an attribute can store an attribute value or a link to another entity that is related to the entity. A schema for an entity type defines the attributes of the entity.

As illustrated, the example knowledge graph 400 is a partial knowledge graph including entities related to a topic entity 110. For example, another topic entity 402 is related to the topic entity 110 as a related, similar topic. As another example, a site entity 406 is related to the topic entity 110 as a related site. The site entity 460 may be, for example, a website. As another example, the document entity 404 is related to the topic entity 110 as a tagged, explicit document. For example, the document entity 404 can be tagged by a user curating a topic page for the topic entity 110. As another example, the document entity 402 is related to the topic entity 110 as a suggested document. As another example, the person entity 408 is related to the topic entity 110 in that the person entity 408 follows the topic entity 110, the person entity 408 is an expert in relation to the topic entity 110, and the person entity 408 is frequently used or is trending as a resource in relation to the topic entity 110. As another example, the topic 404 is related to the topic entity 110 as a potential disambiguation topic. For example, if the topic 405 is the acronym ACL for anterior cruciate ligament, it may be related in a disambiguation sense to the topic 110 if it is the acronym ACL for access control list.

Figure 5:
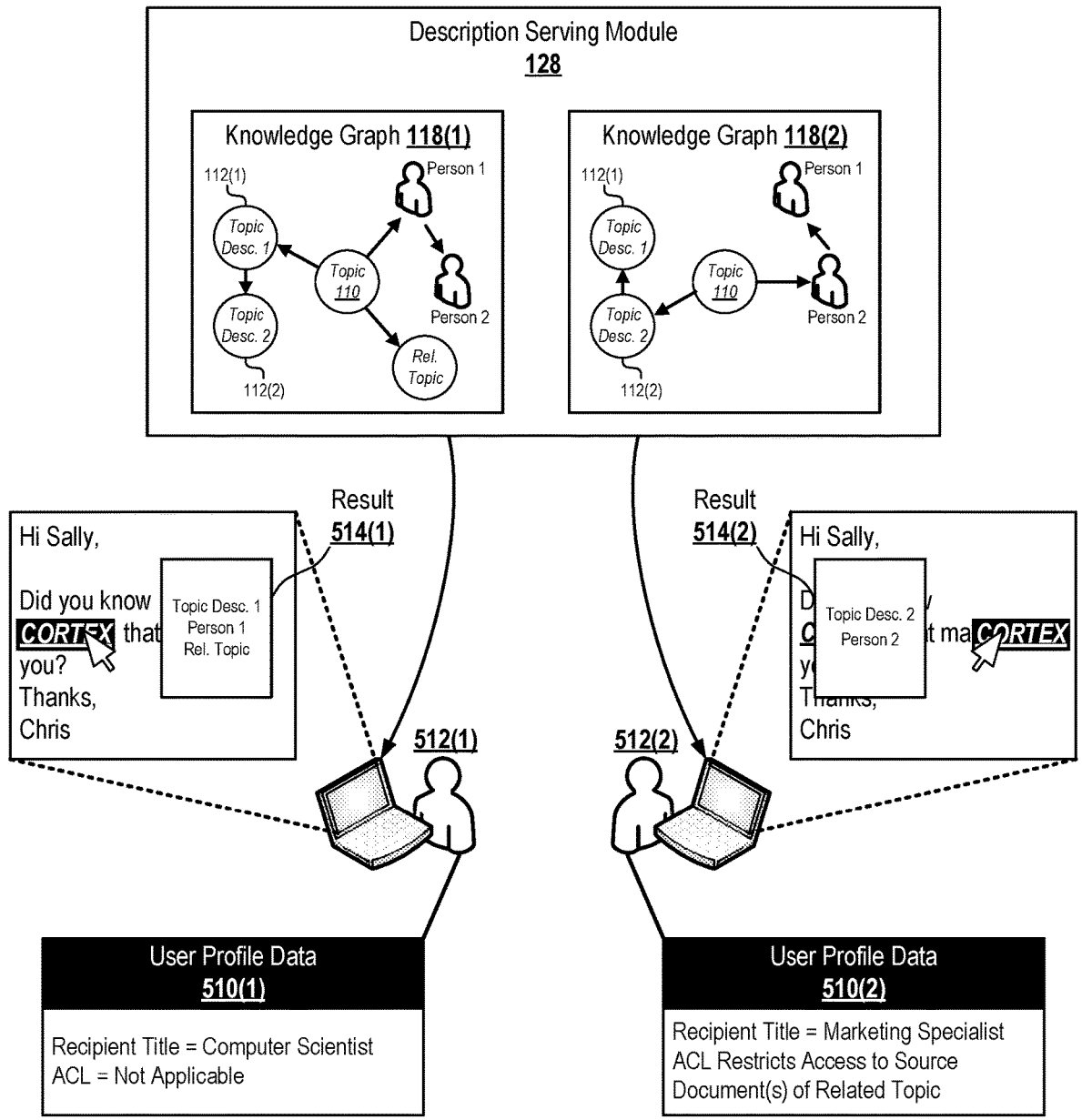
FIG. 5 illustrates an exemplary scenario in which the description serving module selects entities from two different user-specific knowledge graphs in response to similar trigger events occurring with respect to two different recipients.

Turning now to FIG. 5, illustrated is an exemplary scenario in which the description serving module 128 selects entities from two different user-specific knowledge graphs in response to similar trigger events occurring with respect to two different recipients. As illustrated, a first knowledge graph 118(1) defines first interlinkages between a plurality of entities and a second knowledge graph 118(2) defines second interlinkages between a subset of the plurality of entities.

In the illustrated example, the first knowledge graph 118(1) corresponds to a first user 512(1) and the second knowledge graph 118(2) corresponds to a second user 512(2). Furthermore, the first knowledge graph 118(1) includes interlinkages, between the plurality of entities, that are determined based on first user profile data 510(1) whereas the second knowledge graph 118(2) includes different interlinkages, between a subset of the entities linked in the first knowledge graph 118(2), that are determined based on second user profile data 510(2).

The first user profile data 510(1) indicates that the first user 512(1) has the title of "Computer Scientist." The second user profile data 510(2) indicates that the second user 512(2) has the title of "Marketing Specialist." Accordingly, it can be appreciated that for any particular topic 110, different related entities such as topic descriptions 112(1) and 112(2) and/or person 1 and person 2 may be more appropriate resources for the different users. For illustrative purposes, presume that the first topic description 112(1) is authored by a computer scientist and includes technical details suitable for other computer scientists. Further presume that the second topic description 112(2) is authored by a marketing specialist and includes high level marketing details such as purported benefits of a technology or software program.

Based on these different characteristics of the different entities (i.e., the first and second topic descriptions) the first and second knowledge graphs interlink the same entities differently. For example, as illustrated in the first knowledge graph 118(1), the topic 110 is directly interlinked to the first topic description 112(1) and indirectly linked to the second topic description 112(2) since the first topic description 112(1) is more likely useful to a "Computer Scientist." Furthermore, in the first knowledge graph 110(1) the topic is directly linked to person 1 and indirectly linked to person 2 (e.g., person 1 may have the title of computer scientist and/or may have authored the first topic description 112(1)). In contrast, in the second knowledge graph 118(2), the topic 110 is directly interlinked to the second topic description 112(2) and indirectly linked to the first topic description 112(1) since the second topic description 112(2) is more likely useful to a "Marketing Specialist." Furthermore, in the second knowledge graph 110(2) the topic 110 is directly linked to person 2 and indirectly linked to person 1 (e.g., person 2 may be a marketing employee that is responsible for generating marketing material for the topic 110). Additionally, since the second user profile data 510(2) includes access control list (ACL) definitions which restrict the second user 512(2) from accessing source documents associated with the related topic, the second knowledge graph 118(2) omits interlinkages to this entity.

In the illustrated example, each of the first and second user are shown to access a document which references the topic 110. However, they are each shown different entities that are selected from their respective user-specific knowledge graphs. For example, the first user 512(1) is presented with a first topic card 514(1) that includes the first topic description 112(1) and references each of the first person and the related topic. In contrast, the second user 512(2) is presented with a second topic card 514(2) that includes the second topic description 112(2) and references the second person and does not reference the related topic. Thus, each of the two knowledge graphs 118 shown in FIG. 5 have been generated and maintained in a manner that uniquely corresponds to the two users and, therefore, contain information that matches the users' preferences and/or specific job responsibilities within the enterprise.

Figure 6:
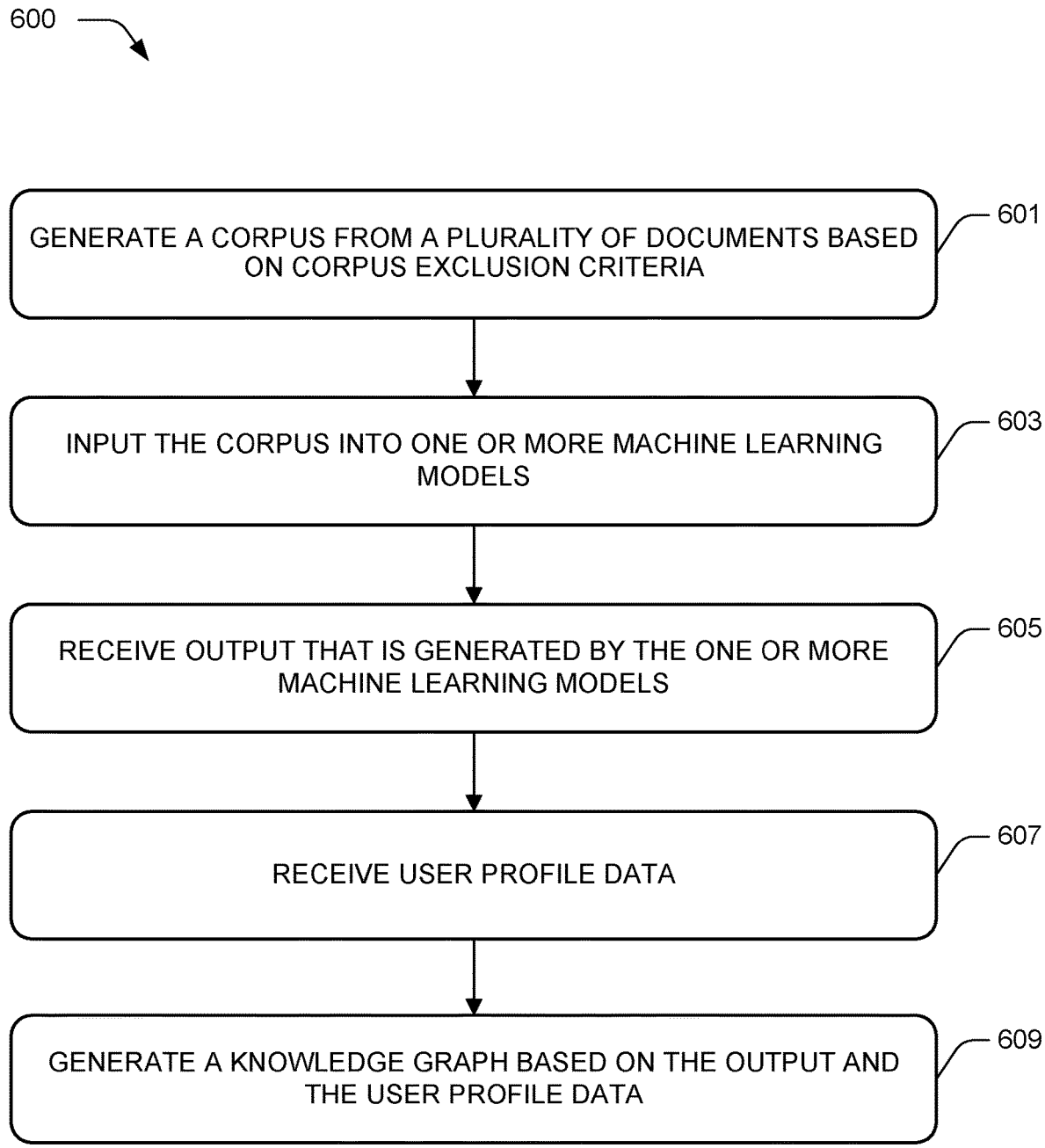
FIG. 6 illustrates a flow diagram of an exemplary process to generate a knowledge graph based on user profile data.

FIG. 6 is a flow diagram of illustrative processes 600 which is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Other processes described throughout this disclosure shall be interpreted accordingly.

Turning now to FIG. 6, illustrated is a flow diagram of an exemplary process 600 to generate a knowledge graph based on user profile data.

At block 601, a system generates a corpus from a plurality of documents based on corpus exclusion criteria. For example, the system may analyze contents of the plurality of documents and/or metadata associated with the plurality of documents to identify a subset of the plurality of documents to include and/or exclude from the corpus. In some implementations, metadata flagging individual documents as being proprietary, sensitive, or confidential may result in these individual documents being excluded from the corpus.

At block 603, the system inputs the corpus into one or more machine learning models. The one or more machine learning models may be configured to extract a plurality of topic descriptions from the corpus. For example, a topic description related to a particular topic may be extracted and then the particular topic may be parsed from the extracted topic description based on a rule-based term extractor. Additionally, or alternatively, one or more machine learning models may be configured to generate a ranked listing of the plurality of topic descriptions based on one or more source contexts that are associated with individual topic descriptions of the plurality of topic descriptions. For example, the topic descriptions may be ranked based on authoritative statuses of a person(s) who authored one or more topic descriptions, dissemination levels of individual topic descriptions across user accounts and/or the enterprise computing resources, attributes of source documents from which the topic descriptions are extracted, and so on. Regarding dissemination levels of individual topic descriptions, the individual topic description may be placed/ranked within the ranked listing based on a degree to which the individual topic description has been distributed to individual user accounts within an enterprise. For example, a topic description that is extracted from a widely published document may be ranked higher than another topic description that is extracted from a different document that is shared with only a few people or resides exclusively within an individual user's private data.

At block 605, the system receives an output that is generated by the one or more machine learning models. The output may include a plurality of extracted topic descriptions and corresponding topic terms that are parsed from the topic descriptions by a rule-based term extractor. Additionally, or alternatively, the output may include a ranked listing of the plurality of extracted topic descriptions. Generally described, the ranked listing may indicate a relative priority for exposing individual topic descriptions over other topic descriptions. Additionally, or alternatively, the output may indications of underlying source contexts of documents from which the plurality of extracted topic descriptions have been extracted.

At block 607, the system may receive user profile data associated with an individual user account and/or a subset of user accounts.

At block 609, the system may generate a knowledge graph from the output based on the user profile data.

Figure 7:
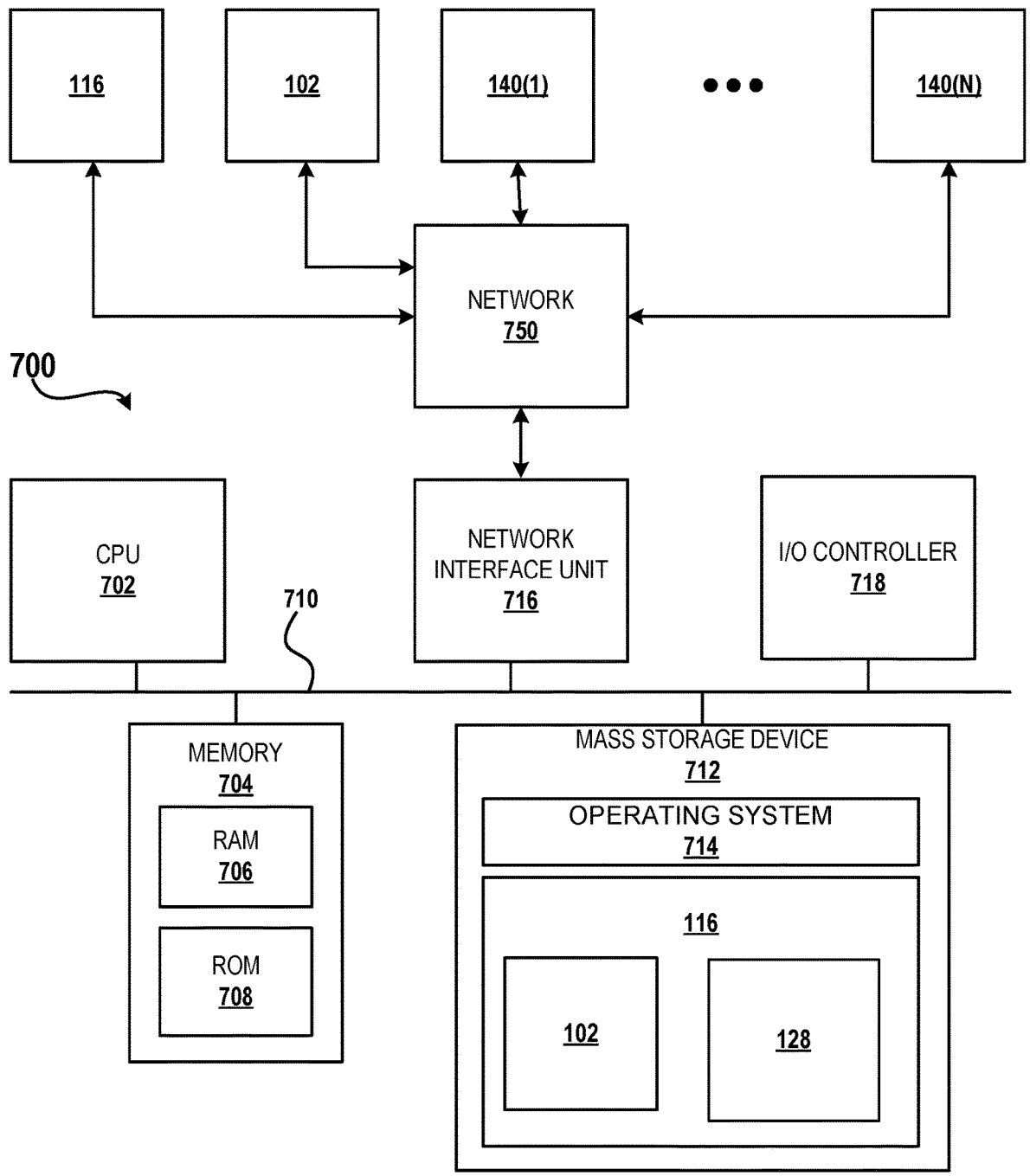
FIG. 7 shows additional details of an example computer architecture for a computer capable of executing the techniques described herein.

FIG. 7 shows additional details of an example computer architecture 700 for a computer capable of executing the techniques described herein. The computer architecture 700 illustrated in FIG. 7 illustrates an architecture for a server computer, or network of server computers, or any other types of computing devices suitable for implementing the functionality described herein. The computer architecture 700 may be utilized to execute any aspects of the software components presented herein.

The computer architecture 700 illustrated in FIG. 7 includes a central processing unit 702 ("CPU"), a system memory 704, including a random-access memory 706 ("RAM") and a read-only memory ("ROM") 708, and a system bus 710 that couples the memory 704 to the CPU 702. A basic input/output system containing the basic routines that help to transfer information between input controls within the computer architecture 700, such as during startup, is stored in the ROM 708. The computer architecture 700 further includes a mass storage device 712 for storing an operating system 714, other data, and one or more application programs.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium," "computer-readable storage medium" and variations thereof, does not include waves, signals, and/or other transitory and/or intangible communication media, per se.

According to various techniques, the computer architecture 700 may operate in a networked environment using logical connections to remote computers through a network 750 and/or another network (not shown). The computer architecture 700 may connect to the network 750 through a network interface unit 716 connected to the bus 710. It should be appreciated that the network interface unit 716 also may be utilized to connect to other types of networks and remote computer systems. The computer architecture 700 also may include an input/output controller 718 for receiving and processing input from a number of other devices, including a keyboard, mouse, or electronic stylus (not shown in FIG. 7). Similarly, the input/output controller 718 may provide output to a display screen, a printer, or other type of output device (also not shown in FIG. 7). It should also be appreciated that via a connection to the network 750 through a network interface unit 716, the computing architecture may enable the enterprise computing resources 116 to communicate with one or more of the entity interlinkage platform 102, and/or one or more computing devices 140.

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit input controls, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware input controls constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit input controls constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

EXAMPLE CLAUSES

The disclosure presented herein may be considered in view of the following clauses.

Example Clause 1. A computer-implemented method, the method comprising: receiving a corpus that is extracted from at least one enterprise computing resource storing a plurality of documents in association with a plurality of user accounts; inputting the corpus into a machine learning (ML) model that is configured to extract a plurality of topic descriptions that correspond to a plurality of topics; receiving an output that is generated by the ML model and that defines the plurality of topic descriptions that correspond to the plurality of topics; receiving user profile data that defines, in association with an individual user account of the plurality of user accounts, at least one of: one or more directory attributes associated with the individual user account, or user knowledge graph preferences associated with the individual user account; generating, based on the user profile data, a knowledge graph that defines entity interlinkages between at least a subset of the plurality of topic descriptions; identifying an individual topic within an individual document that corresponds to an access request originating from a client device that corresponds to the individual user account; and selecting, for exposure to the individual user account in association with the individual document, an individual topic description that corresponds to the individual topic within the knowledge graph that is generated based on the user profile data.

Example Clause 2. The computer-implemented method of Example Clause 1, further comprising: causing the client device to expose a topic card, that corresponds to the individual topic, in association with the individual document, wherein the topic card includes: at least a portion of the individual topic description, and one or more links to other topic descriptions that correspond to the entity interlinkages that are defined by the knowledge graph generated based on the user profile data.

Example Clause 3. The computer-implemented method of Example Clause 1, further comprising: receiving user activity data associated with an account subset, of the plurality of user accounts, having at least one particular directory attribute value that is common to the individual user account; and generating the user knowledge graph preferences, that are associated with the individual user account, based on the user activity data that is associated with the account subset.

Example Clause 4. The computer-implemented method of Example Clause 3, wherein the at least one particular directory attribute value, that is common to the individual user account and the account subset, corresponds to at least one of: a department attribute, a title attribute, or a manager attribute.

Example Clause 5. The computer-implemented method of Example Clause 1, further comprising: receiving an access control list that defines, in association with the individual user account, access permissions that: permit access to first source documents from which a first subset of the plurality of topic descriptions are extracted, and restrict access to second source documents from which a second subset of the plurality of topic descriptions are extracted; and restricting exposure of the second subset, of the plurality of topic descriptions, in association with the individual user account.

Example Clause 6. The computer-implemented method of Example Clause 5, wherein the knowledge graph is further generated based on the access control list to omit interlinkages to the second subset of the plurality of topic descriptions.

Example Clause 7. The computer-implemented method of Example Clause 1, wherein the knowledge graph is a user-specific knowledge graph that uniquely corresponds to the individual user account.

Example Clause 8. The computer-implemented method of Example Clause 1, wherein the user knowledge graph preferences uniquely correspond to the individual user account.

Example Clause 9. A system, comprising: at least one processor; and at least one memory in communication with the at least one processor, the at least one memory having computer-readable instructions stored thereupon that, when executed by the at least one processor, cause the at least one processor to: receive a corpus that is extracted from at least one enterprise computing resource storing a plurality of documents in association with a plurality of user accounts; input the corpus into a machine learning (ML) model that is configured to extract a plurality of topic descriptions that correspond to a plurality of topics; receive, from the ML model, an output that defines the plurality of topic descriptions that correspond to the plurality of topics; generate, based on the output, a knowledge graph that defines entity interlinkages between the plurality of topic topics; receive user profile data that uniquely corresponds to an individual user account of the plurality of user accounts; identify, within an individual document that corresponds to an access request associated with the individual user account, an individual topic that the entity interlinkages associate with at least a first topic description and a second topic description; and select, based on the user profile data, between the first topic description and the second topic description for exposure in association with the individual document.

Example Clause 10. The system of Example Clause 9, wherein the computer-readable instructions further cause the at least one processor to: receive user activity data associated with an account subset, of the plurality of user accounts, having at least one particular directory attribute value that is common to the individual user account; and generate user knowledge graph preferences, that are associated with the individual user account, based on the user activity data that is associated with the account subset.

Example Clause 11. The system of Example Clause 9, wherein the computer-readable instructions further cause the at least one processor to: receive an access control list that defines, in association with the individual user account, access permissions that: permit access to a first source document from which the first topic description is extracted, and restrict access to a second source document from which the second topic description is extracted; and select, based on the access control list, the first topic description for exposure in association with the individual document.

Example Clause 12. The system of Example Clause 9, wherein selecting between the first topic description and the second topic description for exposure in association with the individual document is further based on a recipient context.

Example Clause 13. The system of Example Clause 9, wherein the computer-readable instructions further cause the at least one processor to generate the corpus based on at least one of corpus exclusion criteria, or an access control list associated with the individual user account.

Example Clause 14. The system of Example Clause 9, wherein the knowledge graph is a user-specific knowledge graph that uniquely corresponds to the individual user account.

Example Clause 15. The system of Example Clause 9, wherein the computer-readable instructions further cause the at least one processor to: generate, based on the knowledge graph, an annotated knowledge graph that defines access restrictions that correspond to the individual user account.

Example Clause 16. A system, comprising: at least one processor; and at least one memory in communication with the at least one processor, the at least one memory having computer-readable instructions stored thereupon that, when executed by the at least one processor, cause the at least one processor to: receive a corpus that is extracted from at least one enterprise computing resource; input the corpus into a machine learning (ML) model that is configured to extract a plurality of topic descriptions that correspond to a plurality of topics; receive an output that is generated by the ML model and that defines the plurality of topic descriptions that correspond to the plurality of topics; receive user profile data associated with an individual user account of a plurality of user accounts; and generate, based on the user profile data, a knowledge graph that defines entity interlinkages between at least a subset of the plurality of topic descriptions.

Example Clause 17. The system of Example Clause 16, wherein the computer-readable instructions further cause the at least one processor to: identify an individual topic within an individual document that corresponds to an access request originating from a client device that corresponds to the individual user account; and select, for exposure to the individual user account in association with the individual document, an individual topic description that corresponds to the individual topic within the knowledge graph that is generated based on the user profile data.

Example Clause 18. The system of Example Clause 16, wherein the knowledge graph is generated based on user knowledge graph preferences that uniquely correspond to the individual user account.

Example Clause 19. The system of Example Clause 16, wherein the knowledge graph is generated based on an access control list to omit interlinkages to the second subset of the plurality of topic descriptions.

Example Clause 20. The system of Example Clause 16, wherein the knowledge graph is a user-specific knowledge graph that uniquely corresponds to the individual user account.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method, the method comprising:
   receiving a plurality of documents extracted from at least one enterprise computing resource storing the plurality of documents for a plurality of user accounts associated with an enterprise;
   inputting the plurality of documents into a machine learning (ML) model that is configured to extract a plurality of topics;

receiving the plurality of topics from the ML model;
receiving user profile data that defines, in association with an individual user account of the plurality of user accounts, at least one of:
one or more directory attributes associated with the individual user account, or
user knowledge graph preferences associated with the individual user account;
generating, based on the user profile data, a knowledge graph that defines entity interlinkages associating the plurality of topics;
receiving an access request that corresponds to an individual document accessed via the individual user account; and
selecting, using the knowledge graph and for exposure to the individual user account in association with the individual document, an individual topic within the knowledge graph that is generated based on the user profile data.

2. The computer-implemented method of claim 1, further comprising:
causing the client device to expose a topic card, that corresponds to the individual topic, in association with the individual document, wherein the topic card includes:
at least a portion of the individual topic, and
one or more links to other topics that correspond to the entity interlinkages that are defined by the knowledge graph generated based on the user profile data.

3. The computer-implemented method of claim 1, further comprising:
receiving user activity data associated with an account subset, of the plurality of user accounts, having at least one particular directory attribute value that is common to the individual user account; and
generating the user knowledge graph preferences, that are associated with the individual user account, based on the user activity data that is associated with the account subset.

4. The computer-implemented method of claim 3, wherein the at least one particular directory attribute value, that is common to the individual user account and the account subset, corresponds to at least one of: a department attribute, a title attribute, or a manager attribute.

5. The computer-implemented method of claim 1, further comprising:
receiving an access control list that defines, in association with the individual user account, access permissions that:
permit access to first source documents from which a first subset of the plurality of topics are extracted, and
restrict access to second source documents from which a second subset of the plurality of topics are extracted; and
restricting exposure of the second subset, of the plurality of topics, in association with the individual user account.

6. The computer-implemented method of claim 5, wherein the knowledge graph is further generated based on the access control list to omit interlinkages associating the second subset of the plurality of topics.

7. The computer-implemented method of claim 1, wherein the knowledge graph is a user-specific knowledge graph that uniquely corresponds to the individual user account.

8. The computer-implemented method of claim 1, wherein the user knowledge graph preferences uniquely correspond to the individual user account.

9. A system, comprising:
at least one processor; and
at least one memory in communication with the at least one processor, the at least one memory having computer-readable instructions stored thereupon that, when executed by the at least one processor, cause the at least one processor to:
receive a plurality of documents extracted from at least one enterprise computing resource of an enterprise, the plurality of documents associated with a plurality of user accounts;
input the plurality of documents into a machine learning (ML) model that is configured to extract a plurality of topics;
receive, from the ML model, an output that defines the plurality of topics;
generate, based on the output, a knowledge graph that defines entity interlinkages associating the plurality of topics and at least a first topic description and a second topic description for an individual topic;
receive user profile data that uniquely corresponds to an individual user account of the plurality of user accounts, wherein the user profile data defines a role within the enterprise;
receive an access request associated with the individual topic; and
in response to receiving the access request associated with the individual topic, select, using the knowledge graph and based on the user profile data defining the role within the enterprise, between the first topic description and the second topic description for exposing the individual topic via the individual user account.

10. The system of claim 9, wherein the computer-readable instructions further cause the at least one processor to:
receive user activity data associated with an account subset, of the plurality of user accounts, having at least one particular directory attribute value that is common to the individual user account; and
generate user knowledge graph preferences, that are associated with the individual user account, based on the user activity data that is associated with the account subset.

11. The system of claim 9, wherein the computer-readable instructions further cause the at least one processor to:
receive an access control list that defines, in association with the individual user account, access permissions that:
permit access to a first source document from which the first topic description is extracted, and
restrict access to a second source document from which the second topic description is extracted; and
select, based on the access control list, the first topic description for exposure in association with the individual document.

12. The system of claim 9, wherein selecting between the first topic description and the second topic description for exposing the individual topic via the individual user account is further based on a recipient context.

13. The system of claim 9, wherein the computer-readable instructions further cause the at least one processor to generate the plurality of documents based on at least one of exclusion criteria, or an access control list associated with the individual user account.

14. The system of claim 9, wherein the knowledge graph is a user-specific knowledge graph that uniquely corresponds to the individual user account.

15. The system of claim 9, wherein the computer-readable instructions further cause the at least one processor to:
generate, based on the knowledge graph, an annotated knowledge graph that defines access restrictions that correspond to the individual user account.

16. A system, comprising:
at least one processor; and
at least one memory in communication with the at least one processor, the at least one memory having computer-readable instructions stored thereupon that, when executed by the at least one processor, cause the at least one processor to:
receive a plurality of documents that is extracted from at least one enterprise computing resource storing the plurality of documents for a plurality of user accounts associated with an enterprise;
input the plurality of documents into a machine learning (ML) model that is configured to extract a plurality of topics;
receive the plurality of topics from the ML model;
receive user profile data associated with an individual user account of a plurality of user accounts; and
generate, based on the user profile data, a knowledge graph that defines entity interlinkages associating the plurality of topics;
receive an access request that corresponds to an individual document accessed via the individual user account; and
select, using the knowledge graph and for exposure to the individual user account in association with the individual document, an individual topic within the knowledge graph that is generated based on the user profile data.

17. The system of claim 16, wherein the knowledge graph is generated based on user knowledge graph preferences that uniquely correspond to the individual user account.

18. The system of claim 16, wherein the knowledge graph is generated based on an access control list to omit interlinkages associating a subset of the plurality of topics.

19. The system of claim 16, wherein the knowledge graph is a user-specific knowledge graph that uniquely corresponds to the individual user account.

20. The method of claim 1, wherein the user profile data defines a role within the enterprise and the individual topic is selected based on the role within the enterprise.

* * * * *